June 7, 1949. H. R. MALLORY 2,472,601
PARACHUTE CANOPY
Filed Oct. 25, 1946 2 Sheets-Sheet 1
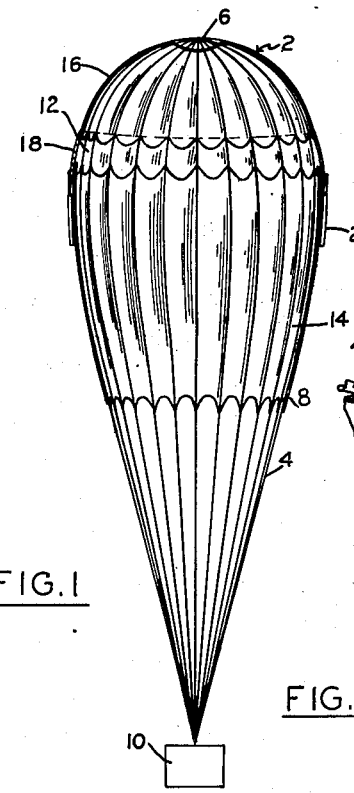
FIG.1
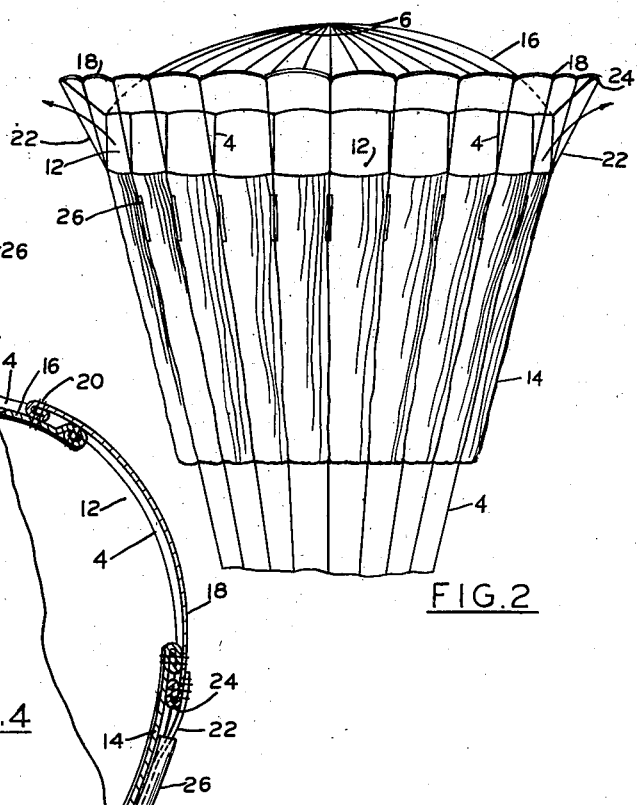
FIG.2
FIG.4
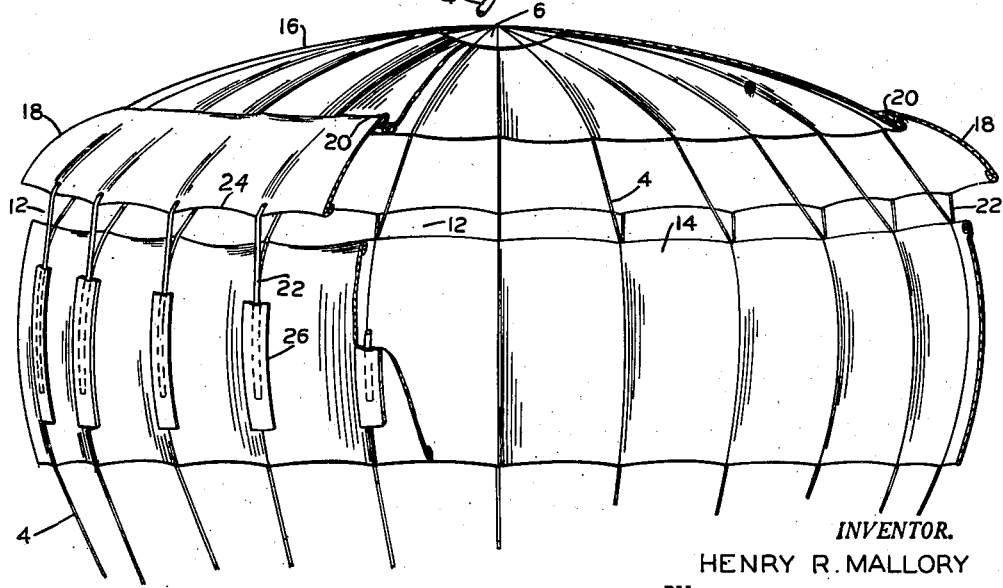
FIG.3
INVENTOR.
HENRY R. MALLORY
BY
Albert Sperry
ATTORNEY June 7, 1949.  H. R. MALLORY  2,472,601
PARACHUTE CANOPY Filed Oct. 25, 1946  2 Sheets-Sheet 2

INVENTOR.
HENRY R. MALLORY
BY
*Albert Sperry*
ATTORNEY

Patented June 7, 1949

2,472,601

UNITED STATES PATENT OFFICE 2,472,601

PARACHUTE CANOPY

Henry R. Mallory, Manchester, Conn., assignor to Pioneer Parachute Company, Inc., Manchester, Conn., a corporation of Connecticut Application October 25, 1946, Serial No. 705,632

8 Claims. (Cl. 244—145)

My invention relates to parachutes, and particularly to novel constructions for parachute canopies whereby shock loading and strains to which parachutes and their loads are subjected are materially reduced.

The shock loading and strains to which parachutes, parachute harnesses and wearers are subjected on opening of the parachute increase very materially as the speed of travel of the aircraft and the parachute is increased. For this reason parachutes as heretofore produced have not been suitable for use in escape from high speed aircraft or have made it necessary for the wearers to delay opening of the parachute until they have fallen a considerable distance and their speed of descent has decreased due to the wind resistance of the wearer. This has made it hazardous or impractical to use parachutes in escaping from high speed aircraft, particularly at low altitudes. Furthermore, the strains applied to the fabric and to the harness and hardware may cause one or more of these elements to rupture, whereas the shock to which the wearer is subjected on opening of the parachute while travelling at high speed may give rise to serious and painful injuries or may even prove fatal to the wearer.

In accordance with my invention these objections to parachutes as heretofore produced are overcome by providing means for relieving the strains and pressures exerted on the parachute on opening thereof. This result is preferably attained by means of elements which serve to permit the escape of air from the canopy on shock loading thereof or at other times when the parachute is subjected to severe strain.

One of the objects of my invention is to reduce the strains applied to the parachute, harness and wearer incident to shock loading of the parachute.

Another object of my invention is to provide novel parachute canopy constructions embodying means for permitting the escape of air from beneath the canopy when the pressure of the air on the interior of the canopy is abnormally high.

A particular object of my invention is to provide a parachute canopy with elements which function as a relief valve to permit the escape of air from beneath the canopy under predetermined conditions.

These and other objects and features of my invention will appear from the following description thereof in which reference is made to the figures of the accompanying drawings.

In the drawings:

Fig. 1 is a diagrammatic sectional view through a typical parachute embodying my invention as seen when air first enters the canopy;

Fig. 2 is a perspective of the construction illustrated in Fig. 1 showing the parachute as seen prior to full opening of the parachute canopy;

Fig. 3 is a view partly in section and partly in elevation illustrating the construction shown in Figs. 1 and 2, as seen during normal descent of the parachute;

Fig. 4 is a sectional view illustrating a detail of the construction shown in Figs. 1 to 3;

Figure 5:
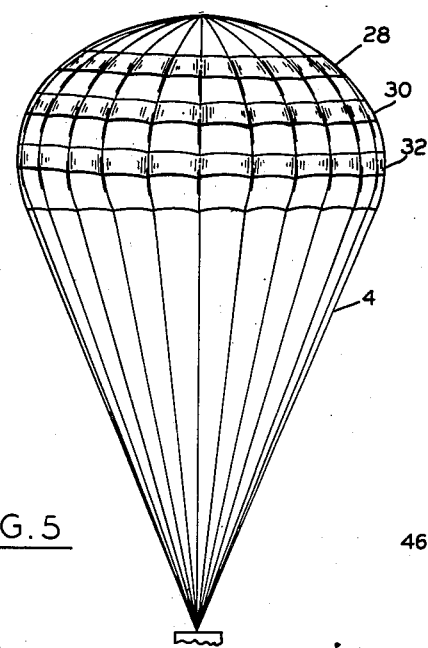
Figs. 5 and 6 are diagrammatic side elevations of alternative forms of parachutes embodying my invention.

In that form of my invention illustrated in Figs. 1 to 4 of the drawing, the parachute embodies a canopy indicated generally at 2 and having suspension lines 4 secured thereto and extending downward from the vent 6 in the peak of the canopy to the skirt 8 and thence to the load 10. A relief vent or opening 12 is formed in the canopy and as shown is annular in form and divides the canopy into a lower skirt portion 14 and an upper peak portion 16. Closure means 18 for the relief vent 12 are located in position to restrict or close the relief vent during normal descent of the parachute and when the pressure or forces applied to the inner surface of the canopy is limited. The closure means shown in Figs. 1 to 4 consists of an annular fabric member secured to the peak portion 16 of the canopy adjacent the upper edge of the relief vent 12 as indicated at 20. The closure means preferably is of sufficient size to extend downward over the relief vent opening and into contact with the upper edge of the skirt portion 14 of the canopy so as to close the vent completely. However, it will be apparent that the closure may only partially cover the vent opening if desired, provided it serves to restrict the area of the vent materially when in a closed position.

The closure means 18 is normally urged to a closed position by resilient means such as the elastics 22 which are connected at one end to the suspension lines 4 below the relief opening 12 and are connected at their opposite ends to the free edge 24 of the closure means 18. The elastics 22 are preferably covered by housing strips 26 to prevent them from becoming entangled with each other or with the suspension lines or canopy when the parachute is packed and while it is being unfolded and expanded to operative position. The elastics 22 generally are under little or no tension when the closure means 18 is in its closed position wherein it conforms to the shape of the normally inflated canopy. However, upon application of excessive pressure to the lower surface of the canopy the closure means 18 is movable outward to the position indicated in Fig. 2 against the action of the elastics 22. Air may then escape readily from the interior of the canopy and through the relief opening 12 so as to pass outward beneath the free edge 24 of the closure means 18. Further opening of the canopy is then halted or takes place gradually so that the canopy is not fully extended until the parachute and load have decelerated sufficiently to overcome all danger of injury to the canopy, harness or wearer.

The operation of the construction described above is illustrated by Figs. 1, 2 and 3 wherein Fig. 1 shows the form which the parachute assumes when it is first fully drawn out of the pack in which it is stored and as the air first enters the canopy and flows into the peak thereof. Since only a limited amount of air can escape through the vent 6 in the peak of the canopy, the peak portion 16 is quickly and fully extended to the position shown in Fig. 2. When the parachute descends or travels at high speed during the initial stages of opening of the parachute, the air entering the canopy and flowing into the peak thereof exerts considerable pressure on the inner surface of the canopy. Under such conditions the pressure exerted upon the inner surface of the closure means 18 covering the vent 12 is sufficient to force the closure means outward against the action of the elastics 22. The closure means then assume the position shown in Fig. 2 and air escapes through the vent 12 and about the peak portion of the canopy as indicated by the arrows. At the same time the peak portion of the canopy presents a limited but substantial resistance to the air which is sufficient to decelerate the parachute and its load gradually. Moreover by forming the peak portion 16 of suitable diameter, the skirt of the canopy is held open far enough to insure continued flow of air into the canopy so as to prevent collapse thereof.

When the closure means 18 is in the position of Fig. 2, the air entering the canopy adjacent the skirt and passing out through the vent 12 produces a chimney effect within the lower skirt portion 14 relieving the outwardly directed pressure of the air tending to expand the skirt portion. The skirt portion 14 of the canopy therefore remains unextended and in fact is held against expansion by the tension exerted on the suspension lines 4 due to the momentum of the load 10 during initial deceleration.

Motion pictures of parachutes embodying my invention show that the parachute canopy and closure means remain in substantially the positions shown in Fig. 2 until the speed of travel of the parachute has been materially reduced. Thereafter the pressure of the air on the inner surface of the canopy and acting on the closure means 18 is reduced and the elastics connected to the closure 18 tend to draw the closure downward to approximately the semi-closed position of Fig. 3. The closure 18 then deflects or obstructs the outward flow of the air issuing from the vent 12 so that a back pressure is built up in the chimney-like skirt portion 14 of the canopy. Moreover, the tension on the suspension lines 4 is reduced as the rate of deceleration decreases until finally the air pressure within the skirt portion 14 becomes sufficient to overcome the tension on the suspension lines. The skirt portion 14 then expands to its fully extended and normal position of descent as illustrated in Fig. 3 or Fig. 4.

Expansion of the skirt portion of the canopy results in further deceleration of the parachute and load, but this secondary deceleration does not take place until the parachute is traveling at a reduced speed which is insufficient to subject the wearer or the elements of the parachute assembly to dangerous strains or shock. The vent and closure thus serve as complementary means for retarding opening of the skirt portion of the canopy when the parachute is traveling at high speed and for insuring opening of the skirt portion of the canopy when the speed of the parachute has been reduced sufficiently to eliminate all danger of injury to the canopy, harness or load due to shock loading of the parachute. The action of the closure means 18 in closing, restricting or obstructing the flow of air from the vent 12 serves to hasten the opening of the skirt portion of the canopy to its fully extended position by causing the back pressure within the skirt portion to build up as rapidly as safe operation will permit. The strength or elasticity of the elastics 22 which tend to draw the closure means toward a closed position therefore have an important influence on the operation of the parachute and the speed at which it will open fully.

During the normal descent of the parachute the free edge 24 of the closure means 18 preferably lies substantially in contact with the fabric at the upper edge of the skirt portion 14 of the canopy as shown in Fig. 4. The relief opening 12 is therefore effectively closed during normal descent insuring safe gradual descent of the parachute and its load.

The position of the relief vent and its area may be varied considerably, but the most satisfactory results have been obtained when the area of the vent is equal to from about 5% to 20% of the total area of the canopy. The location of the relief vent in the construction shown in Figs. 1, 2 and 3 largely serves to determine the extent of opening of the canopy during the deceleration period when the relief vent is open and only the peak portion 16 of the canopy is expanded as shown in Fig. 2. Therefore, the vent preferably is spaced from the peak of the canopy far enough to hold the skirt open at all times and insure the entry of sufficient air into the canopy to overcome any possibility of collapse or closing of the skirt. In practice the vent has been located about one-third of the distance from the peak to the skirt of the canopy.

In some instances it is also desirable to form the peak portion 16 of the canopy of heavier, stronger or more porous material than the skirt portion 14 so that it will withstand the impact and pressure of air thereon during the initial stages of opening of the parachute. This is readily accomplished in the present invention because the peak portion and skirt portion are completely separated and may be produced as separate elements when an annular vent is employed.

The alternative construction shown in Fig. 5 embodies a plurality of annular vents 28, 30 and 32 which are concentric and thus located at different distances from the peak of the canopy. The number of such vents and their area may be varied to cause selective or successive operation of the vents during opening and descent of the parachutes.

Figure 6:
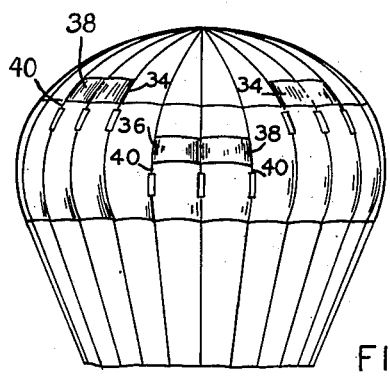

As illustrated in Fig. 6 a number of separate and spaced relief vents 34 and 36 may be formed in the canopy and each vent may be provided with a separate closure means 38 and elastics 40 for urging the closure means to a normal closed position. The operation of the closure means in relieving pressures applied to the inner surface of the canopy in this form of my invention is substantially the same as when using the construction of Figs. 1 to 4. However, the relief openings 34 and 36 may be located at various points about the canopy and the strength and resiliency of the elastics may be varied as desired. Thus, for example, the vent openings 34 near the peak of the canopy may be relatively small and the elastics associated therewith may be relatively weak and proportioned to relieve the pressures which result from the first rush and impact of air entering the canopy as the canopy is drawn out from its pack. On the other hand the vent openings 36 which are spaced further from the peak of the canopy may be relatively large and provided with stronger elastics to serve as relief valves which are operable only on shock loading of the canopy.

Figure 7:
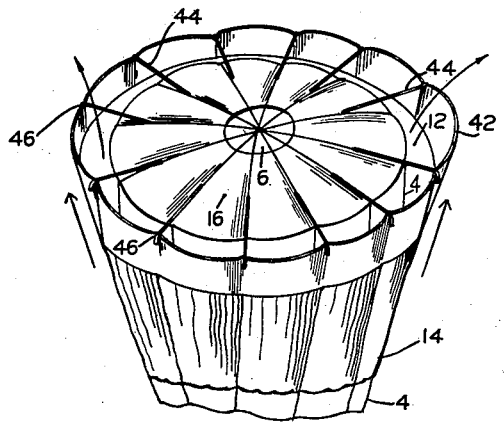
Figs. 7 and 8 are diagrammatic perspective views of further alternative embodiments of my invention.
Figure 8:
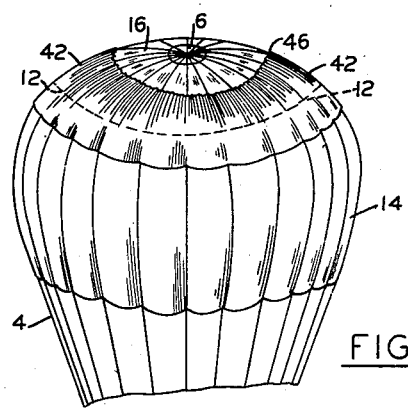

In those forms of my invention shown in Figs. 7 and 8 the closure means 42 for the relief vent 12 are secured to the skirt portion 14 of the canopy below the vent so that the closure will open upward and outward in response to pressure on the interior of the canopy. The elastics 44 in Fig. 7 are secured at one end to the free edge 46 of the closure means and are secured at their opposite ends to the peak portion of the canopy to urge the closure toward a closed position. In the alternative as shown in Fig. 8 the elastic may be carried wholly by the closure. For this purpose the free edge 46 of the closure may be provided with an annular elastic means which normally tends to constrict the free edge of the closure 42 so that it will overlie the vent 12. With either of the constructions shown in Figs. 7 and 8 the closure means offers little or no obstruction to outward flow of air from the parachute during the period of initial deceleration and the action of the elastics in urging the closure inward toward a closed position is aided by the air flowing upward along the exterior or the unexpanded skirt of the canopy as indicated by the arrows.

In each of the forms of my invention illustrated and described the closure means is movable outward to permit the escape of air from beneath the canopy upon application of predetermined pressure thereon. The strains imposed on the fabric of the canopy and on the suspension lines, harness and wearer are thus materially reduced during deceleration or shock loading of the parachute. The effectiveness of the present invention is well illustrated by tests conducted on two scale model parachutes, each 12 feet in diameter, one of which was constructed in the same manner as a standard U. S. Army parachute, and the other was similarly constructed, but provided with an annular relief vent of the type illustrated in Figs. 1 to 4. This vent was located approximately two-thirds of the distance from the skirt to the peak of the canopy and was 8 inches in width, thus constituting about 10% of the total area of the canopy. The closure means employed was approximately 10 inches in width and therefore when in closed position it effectively covered the relief vent.

Figure 9:
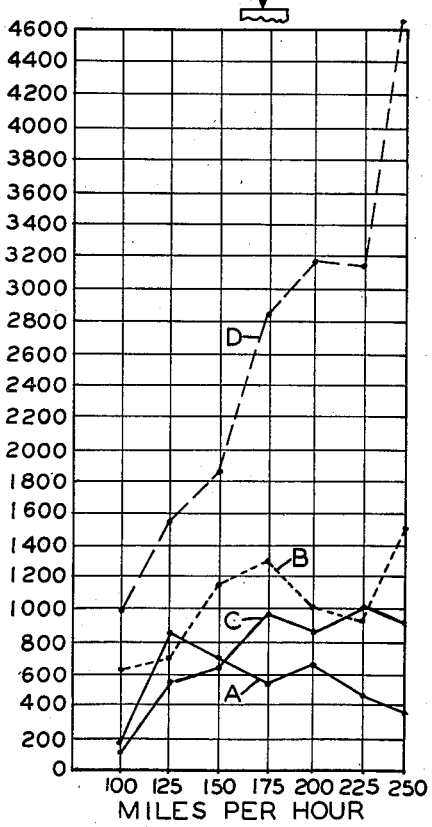
Fig. 9 is a chart showing the results of tests in which a parachtue embodying my invention was compared with a standard parachute.

The results of these tests are indicated in Fig. 9 wherein the solid lines indicate the characteristics of the parachute embodying my invention, whereas the dotted lines indicate the characteristics of the standard parachute. Line A indicates the recordings on a tensiometer resulting from the initial impact to which the 12 foot diameter scale model canopy embodying my invention was subjected when open at various speeds from 100 to 250 miles per hour. Line B indicates the tensiometer recordings for the initial impact upon the 12 foot diameter scale model of the standard army parachute. Line C indicates the tensiometer readings on final impact of the 12 foot diameter scale model parachute embodying my invention, whereas Line D shows the tensiometer readings on final impact for the 12 foot scale model of the standard army parachute.

From these tests it is apparent that there is some reduction in the initial impact resulting from the use of that form of my invention illustrated in Figs. 1 to 4 but the reduction in the final impact is amazingly reduced, particularly at high speeds. Thus at 250 miles per hour the tensiometer reading for the final impact on the scale model parachute embodying my invention was less than 400 lbs., whereas tensiometer readings for the final impact on the scale model standard army type parachute was 4610 lbs. In fact, at speeds in excess of 150 miles per hour the final impact when using parachutes embodying my invention is less than the initial impact, whereas the final impact on the scale model standard army type parachute was in excess of 1800 lbs. It is therefore apparent that the safety and comfort afforded by parachutes embodying my invention greatly exceeds that of parachutes heretofore produced.

From the foregoing description of my invention it will be apparent that the size, shape, number and location of the relief openings or vents may be varied considerably, and the results obtained with any particular construction can therefore be varied with changes in the size and shape of the canopy. In view thereof it should be understood that the embodiments of my invention shown in the drawings and described above are intended to be illustrative only and are not intended to limit my invention.

I claim:

1. A parachute having a canopy divided into two areas constituting a lower skirt portion and an upper peak portion separated by an air vent, elastic means normally tending to close said air vent and yieldable in response to pressure applied to the inner surface of the canopy during shock loading to permit opening of said air vent, said elastic means being of sufficient strength to close said vent at least partially after shock loading and when the parachute is subjected to the forces incident to normal decent, said peak portion being of sufficient diameter when fully extended to hold said skirt portion open to receive air although said skirt portion is not fully extended.

2. A parachute having a canopy with an annular vent therein spaced from the peak of the canopy, and elastic means normally tending to close said vent but yieldable in response to the forces applied to the parachute on shock loading thereof for opening said vent, said elastic means being of sufficient strength to close said vent at least partially when said canopy is subjected to forces incident to normal descent following sock loading of the parachute.

3. A parachute having a canopy with an annular vent therein spaced from the peak of the canopy, an annular closure member secured at one edge to the exterior of the canopy adjacent said vent and of sufficient length radially of the canopy to extend over said vent to close the vent, and elastics connected to said canopy and the opposite edge of said closure member and of sufficient strength to hold said closure in a substantially closed position during normal descent of the parachute but yieldable to permit said closure member to open when said canopy is subjected to the forces incident to shock loading of the parachute.

4. A parachute having a canopy with a plurality of radially spaced annular vents therein and closures for said vents responsive to the forces applied to the parachute on shock loading of the parachute for opening said vents.

5. A parachute having a canopy with a plurality of radially spaced annular vents therein and closures for said vents located on the exterior of said canopy and movable in response to pressure applied thereto from the interior of the canopy for opening said vents.

6. A parachute adapted for use at high speed comprising a canopy having a quick opening portion and a delayed opening portion both of which are movable to extended positions in response to the pressure of air entering said canopy, means for holding said portions in fixed relative positions in said canopy, and means connected to said delayed opening portion of the canopy and responsive to the inertia of a load connected to said parachute for opposing the opening of said delayed opening portion of the canopy.

7. A parachute adapted for use at high speed comprising a canopy having a quick opening portion and a delayed opening portion both of which are movable to extended positions in response to the pressure of air entering said canopy, suspension lines fixedly secured to both of said portions and serving to hold said portions in fixed relative positions in said canopy, and means for relieving the pressure of the air exterted on said delayed opening portion of the canopy during initial deceleration of the parachute due to opening of said quick opening portion thereof.

8. A parachute adapted for use at high speed comprising a canopy having a quick opening portion and a delayed opening portion both of which are movable to extended positions in response to the pressure of air entering said canopy, means for holding said portions in fixed relative positions in said canopy, means connected to said delayed opening portion of the canopy and responsive to the inertia of a load connected to said parachute for opposing the opening of said delayed opening portion of the canopy, and means for relieving the pressure of the air exerted on said delayed opening portion of the canopy during initial deceleration of the parachute due to opening of said quick opening portion thereof.

HENRY R. MALLORY.

REFERENCES CITED

The following references are of record in the file of this patent:

UNITED STATES PATENTS

| Number | Name | Date |
|---|---|---|
| 1,685,688 | Thornblad | Sept. 25, 1928 |
| 2,164,122 | Pool | June 27, 1939 |

FOREIGN PATENTS

| Number | Country | Date |
|---|---|---|
| 28,518 | France | Nov. 26, 1924 |
| | (Addition to No. 544,865) | |
| 818,873 | France | June 28, 1937 |
| 853,407 | France | Dec. 7, 1937 |